United States Patent [19]

Lockett et al.

[11] Patent Number: 4,711,745

[45] Date of Patent: Dec. 8, 1987

[54] HIGH TURNDOWN BUBBLE CAP TRAY

[75] Inventors: Michael J. Lockett, Grand Island; Daniel R. Summers, North Tonawanda, both of N.Y.; Vinson C. Smith; James C. Upchurch, both of Houston, Tex.

[73] Assignee: Union Carbide Corporation, Danbury, Conn.

[21] Appl. No.: 1,419

[22] Filed: Jan. 8, 1987

[51] Int. Cl.[4] .............................................. B01F 3/04
[52] U.S. Cl. ................................................... 261/114.2
[58] Field of Search ..................................... 261/114.2

[56] References Cited

U.S. PATENT DOCUMENTS

| | | | |
|---|---|---|---|
| 2,085,522 | 6/1937 | Baars | 261/114 |
| 2,531,030 | 11/1950 | Craft | 261/114 |
| 2,539,142 | 1/1951 | Kelley et al. | 261/114 |
| 2,627,397 | 2/1953 | Hendrix | 261/114 |
| 2,692,128 | 10/1954 | Bowles | 261/114 |
| 4,510,023 | 4/1985 | Bennett et al. | 203/99 |
| 4,578,153 | 3/1986 | Newton | 203/99 |

*Primary Examiner*—Tim Miles
*Attorney, Agent, or Firm*—M. N. Reinisch

[57] ABSTRACT

A bubble cap tray enabling efficient mass transfer over a wide range of vapor-liquid flowrates comprising bubble caps having triangular-shaped openings of substantially equal total area disposed in rows distant from the inlet and proximate the inlet wherein the bubble caps in rows distant from the inlet experience a substantially equal liquid head across the tray and the bubble caps in rows proximate the inlet experience a lesser liquid head than the bubble caps in the rows distant from the inlet.

8 Claims, 7 Drawing Figures

U.S. Patent  Dec. 8, 1987  Sheet 1 of 3  4,711,745
FIG. 1
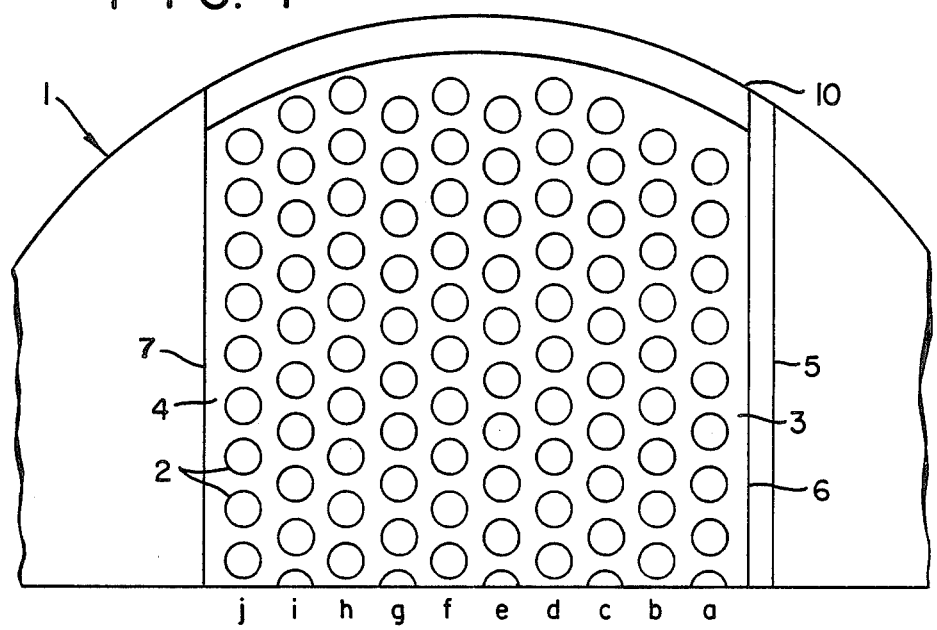
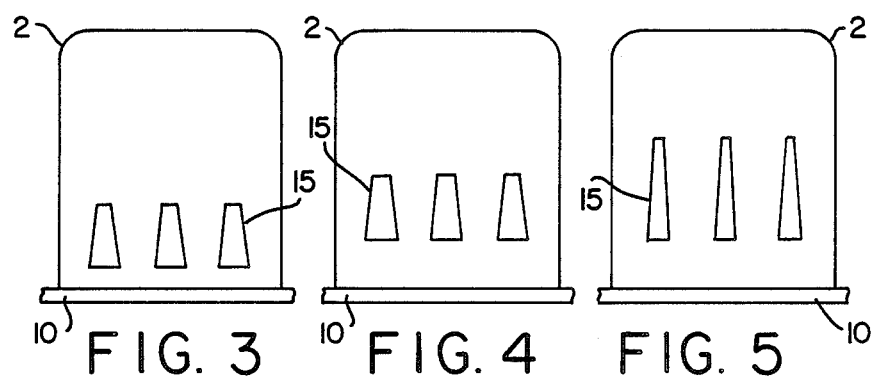
FIG. 3  FIG. 4  FIG. 5
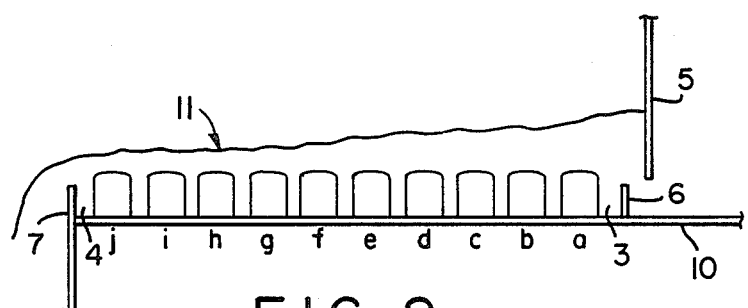
FIG. 2

HIGH TURNDOWN BUBBLE CAP TRAY

TECHNICAL FIELD

This invention relates to bubble cap trays useful in distillation columns or other vapor-liquid contacting means.

BACKGROUND ART

Bubble cap trays are well known and are extensively employed in distillation columns. A useful discussion of bubble cap trays may be found in Design of Equilibrium Stage Processes, Smith, McGraw-Hill Book Company (1963), Ch 14 Bolles, pp 474–538.

A bubble cap tray comprises a tray deck upon which is disposed a plurality of bubble caps disposed in rows. Liquid flows onto the tray from the tray above it via a downcomer, then flows under a downcomer baffle, usually over an inlet weir, and onto the tray deck. On the tray deck are situated bubble caps such that the vapor issuing from the bubble caps will contact the liquid flowing across the tray. The liquid flows between and/or over the bubble caps from the inlet weir to an outlet weir. The liquid is aerated by the vapor and takes on the form of a froth or foamy liquid. The mechanism of froth movement across the tray is that the froth height or static head of liquid at the tray inlet is higher than the froth height or static head of liquid at the tray outlet. This hydraulic gradient enables the liquid to flow towards the tray outlet. Once the froth reaches the tray outlet, it returns to its liquid form upon deaeration. The deaeration usually occurs in a downcomer on the downstream side of the outlet weir. Once in the downcomer the liquid proceeds down to the next tray and the process is repeated until the bottom of the column is reached. The vapor on a bubble cap tray comes from the tray below and passes up through the tray deck and into the bubble caps through risers. The vapor hits the inside top of the bubble cap and then flows down through the annular area between the outside of the riser and the inside of the bubble cap. The vapor enters the liquid by bubbling through openings in the cap or under the edge of the cap and escapes into the froth on the tray deck. Once on the tray deck the bubbles pass upward through the froth until the top of the froth is reached where the bubbles burst and the vapor continues upwards to the next tray where the process is repeated until the top of the column is reached. Mass transfer occurs between the liquid and vapor. The more volatile components preferentially pass into the vapor phase while the less volatile components pass into the liquid phase. This occurs on each tray causing the more volatile components to concentrate at the top of the column and the less volatile components to accumulate at the bottom of the column.

A problem with bubble cap trays is their limited turndown capability although their capability range is better than other mass transfer devices. Turndown is the ratio of the maximum flowrate of a phase to the minimum flowrate of that same phase while still achieving satisfactory mass transfer. The turndown for conventional bubble cap trays is about 5:1. Thus conventional bubble cap trays cannot be advantageously employed in a distillation column for the separation of feed at large capacity variations. One such separation is the separation of nitrogen from methane in a nitrogen rejection unit which processes a feed from a natural gas reservoir which has been injected with nitrogen as part of an enhanced recovery operation. These units are required to process a very wide range of vapor and liquid flowrates as the nitrogen content of the feed to the unit increases from about 5 to about 80 mole percent during the period of operation of the plant. This application may require a turndown of 20:1 or even higher.

It is therefore an object of this invention to provide an improved bubble cap tray which can operate efficiently at higher turndown than is possible with conventional bubble cap trays.

SUMMARY OF THE INVENTION

The above and other objects which will become apparent to those skilled in the art are attained by the present invention which is a bubble cap tray having a tray deck, a liquid inlet zone having an inlet weir and a liquid outlet zone having an outlet weir capable of establishing a liquid level on the tray deck which generally decreases in height from the inlet zone to the outlet zone, and a plurality of bubble caps disposed in rows which are serially disposed on the tray deck from the inlet zone to the outlet zone, characterized by:

(a) each bubble cap having a plurality of triangular shaped openings;

(b) the total area of said openings on each bubble cap being substantially equal;

(c) each row not proximate the inlet zone having bubble caps with openings whose uppermost portion is at about the same distance beneath the liquid level; and (d) each row proximate the inlet zone having bubble caps with openings whose uppermost portion is closer to the liquid level than is the uppermost portion of the openings of the bubble caps in rows not proximate the inlet zone

BRIEF DESCRIPTION OF THE DRAWINGS

FIG. 1 is a simplified plan view of a portion of one embodiment of the bubble cap tray of this invention.

FIG. 2 is a simplified cross-sectional view of one embodiment of the bubble cap tray of this invention.

FIGS. 3, 4 and 5 are each a representation of a bubble cap useful in the bubble cap tray of this invention.

DETAILED DESCRIPTION

Figure 6:
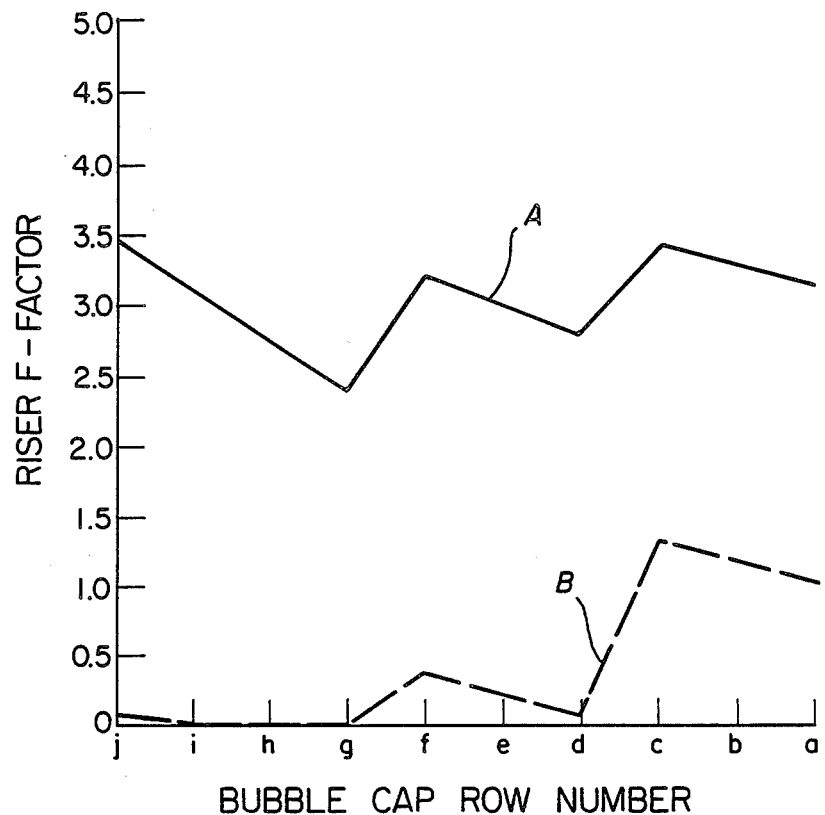
FIG. 6 is a graphical representation of vapor flow through the bubble cap tray of this invention at the design flowrate and at low flowrate.

The bubble cap tray of this invention will be described in detail with reference to the drawings.

Referring now to FIG. 1, bubble cap tray 1 has disposed upon it a plurality of bubble caps 2 disposed in rows a–j on tray deck 10 running serially from inlet zone 3 to outlet zone 4. Liquid is supplied to the tray via downcomer 5 and the liquid flows over inlet weir 6 and across the tray from inlet zone 3 to outlet zone 4 and over outlet weir 7. The liquid level across the tray is higher at the inlet zone than at the outlet zone so as to effect liquid flow across the tray.

FIG. 2 is a cross-sectional representation of the tray of FIG. 1 and the numerals of FIG. 2 correspond to those of FIG. 1 for the common elements. FIG. 2 illustrates liquid level 11 which generally decreases in height from the inlet zone 3 to the outlet zone 4

In operation, vapor from below tray deck 10 passes through the tray deck and into risers within the bubble caps. The vapor passes up through the risers into the bubble caps and then out of the bubble caps through openings in the bubble caps (not shown in FIG. 2). The vapor contacts liquid flowing across the tray thus effecting mass transfer. The degree to which the vapor and liquid come into contact is directly related to the efficiency of the mass transfer on the bubble cap tray. As can be appreciated, a bubble cap tray which may operate efficiently at one feed condition may not necessarily enable efficient mass transfer when the feed is at a significantly different condition.

The bubble cap tray of this invention comprises a combination of four elements which work together to enable efficient operation, despite significant changes in the vapor and liquid flowrates, by providing structures which can compensate for such changes.

One element of the bubble cap tray of this invention is that the bubble caps each have a plurality of triangular-shaped openings through which the vapor can flow out of the bubble cap and into the liquid. The openings need not be exact triangles; they could, for example, be truncated triangles as is illustrated in FIGS. 3-5 which show the openings 15. The triangular-shaped opening narrows towards the top of the opening where vapor passes through the bubble cap. As the vapor flowrate though the opening is reduced, as is characteristic of a feed with changing flowrate, the height of the opening will not reduce in proportion to the reduction in the overall vapor rate. This produces larger open heights at low loads and thus helps to maintain uniform bubble cap activity at very different load conditions. Preferably each of the triangular shaped openings on any given bubble cap will have the same dimensions and most preferably will be equidistantly spaced around the bubble cap.

Another element of the bubble cap tray of this invention is that the total area of the openings on a given bubble cap is substantially equal to the total area of the openings on any other given bubble cap. By substantially equal area it is meant within plus or minus 10 percent. Preferably the area of the openings on each bubble cap will be within 5 percent. In this way, the variation in opening height, which will be discussed later, does not change the area available for bubbling from cap to cap. This means that some openings may be taller and narrower, such as are shown in FIG. 5, than other openings such as are shown in FIGS. 3 and 4. Generally the total area of the openings on a bubble cap will be within the range of from 0.5 to 3.0 square inches.

Yet another element of the bubble cap tray of this invention is a variation in the height of the openings on the bubble caps so as to maintain a constant liquid head over each bubble cap opening. As was discussed previously, the liquid level establishes a gradient across the tray from the inlet zone to the outlet zone. The gradient can be very small to very severe. Preferably each row of bubble caps, which are aligned parallel to the outlet weir, has a unique opening elevation that changes from row to row such that a constant liquid head is maintained above the top of each opening from row to row. However, as a cost saving procedure it is acceptable to have identical opening elevations for several adjacent rows if the liquid gradient across the tray is not severe.

FIGS. 3 and 4 illustrate two bubble caps 2, which have identically shaped openings 15. However, the uppermost portion of the openings of the bubble cap of FIG. 3 is lower than the uppermost portion of the openings of the bubble cap of FIG. 4. The bubble cap of FIG. 3 may be disposed, for example, in rows j, i and h and the bubble cap of FIG. 4 may be disposed, for example, in rows g, f and e. But because the liquid level decreases in height across the tray, the uppermost portion of the openings of each bubble cap are at about the same distance beneath the liquid level, irrespective of which row the bubble cap is disposed in. The variation in the uppermost portion of the openings works to keep the vapor flow uniform across the tray because the depth of liquid above the vapor exit point from each bubble cap on the tray will be the same, thus reducing the potential for non-uniform vapor-liquid contact caused by changing vapor and liquid flowrates and thus ensuring improved mass transfer efficiency across a wide range of operating conditions.

Uniformity of the liquid head above the bubble cap openings is employed for those bubble caps disposed in rows not proximate the inlet zone. For the bubble caps disposed in the row or rows proximate the inlet zone, the uppermost portion of the openings is closer to the liquid level than is the case with the other bubble caps. The openings shown in FIG. 5 are illustrative of the type of bubble cap openings useful in row(s) proximate the inlet zone. The special bubble caps employed in the inlet group promote vapor activity at minimum loading conditions. By using equal open area on each cap on a tray and an approximately uniform liquid seal above each bubble cap opening (except for the bubble caps in the inlet row(s)), the vapor distribution at maximum loading conditions is forced to be largely uniform. However, at minimum loading conditions it is not possible to maintain all of the bubble caps uniformly active. By having special bubble caps in the row(s) proximate the inlet zone which have a higher opening elevation and experience a lesser liquid head than the bubble caps in rows not proximate the inlet zone, the activity of the inlet group of bubble caps is increased and this increase is particularly useful at minimum loading conditions by maintaining efficient vapor-liquid contacting. At such minimum loading conditions the number of active caps is decreased and limited to those at the inlet thereby enabling good continuous activity at those bubble caps rather than sporadic inefficient contacting at caps across the tray. Activity at the inlet is preferable because the liquid flow is more uniform as it enters the tray from the downcomer than it is as it passes across the tray, so that vapor activity at the inlet is more favorable for uniform vapor-liquid contact. In addition, some of the adverse effects of possible liquid leakage from the tray are avoided by ensuring that vapor-liquid contact occurs preferentially proximate the liquid entry region rather than proximate the outlet weir. Initiating bubbling proximate the liquid inlet helps propagate uniform bubbling of subsequent downstream rows of caps as flow rates increase above minimum loading conditions.

Whether the special bubble caps will be disposed in just the single row most proximate the inlet zone, or additionally in one or more rows adjacent the most proximate row, is a design decision which can be made by a skilled tray designer depending upon the degree of turndown, i.e., the difference between maximum and minimum loading, expected.

The following example is presented for illustrative purposes and is not intended to be limiting.

EXAMPLE I

A bubble cap tray of this invention was employed in a distillation column which operated with a feed flowrate at both the design flowrate and at one-fourteenth of the design flowrate, i.e. a turndown of 14:1. The bubble cap tray was similar to that of FIG. 2 in that it had ten rows of bubble caps across the tray. Bubble caps of the type shown in FIG. 3 were disposed in rows j, i, h and g. These bubbles caps each had 15 triangular-shaped openings of the shape shown in FIG. 3 and each cap had a total opening area of about 1.4 square inches. Bubble caps of the type shown in FIG. 4 were disposed in rows f, e and d. These bubble caps were identical to the bubble caps in rows j, i, h and g except that their openings were oriented higher. In this way the liquid head above the uppermost portion of the openings in each of the bubble caps in rows d–j was approximately equal. Bubble caps of the type shown in FIG. 5 were disposed in rows c, b, and a. These bubble caps each had 10 triangular shaped openings of the shape shown in FIG. 5 and each cap had a total opening area of about 1.4 square inches. The uppermost portion of the openings of the bubble caps in rows a–c was closer to the liquid level than was the uppermost portion of the openings of the bubble caps in rows d–j. Thus, in this example, the rows proximate the inlet zone comprised 30 percent of the total rows of the bubble cap tray.

FIG. 6 graphically indicates the vapor flow through the tray at both design and high turndown conditions. In FIG. 6 the horizontal axis denotes the rows and the vertical axis denotes the riser F-Factor which is a measure of vapor flow. Riser F-Factor is equal to the product of the vapor velocity in the riser in feet per second and the square root of the vapor density in pounds per cubic foot.

Curve A illustrates the vapor flow through the bubble caps in each of rows a–j when the feed is at the design flowrate. As can be seen the vapor flowrate through each of the bubble cap rows is about equal thus enabling good vapor liquid contact across the tray at the design operating conditions. Curve B illustrates the vapor flow through the bubble caps in each row when the feed flowrate is only one-fourteenth the design flowrate. In this high turndown situation, activity is preferentially carried out proximate the inlet zone thus ensuring uniform contact between vapor and liquid. Thus it is shown that the bubble cap tray of this invention enables efficient operation at both design and at high turndown conditions.

For comparative purposes a different bubble cap tray was employed in the same distillation column used in Example I under the same operating conditions of design feed flowrate and turndown of 14:1. This bubble cap tray had ten rows (a–j) of bubble caps each of the type shown in FIG. 3. Thus the uppermost portion of the openings of bubble caps in rows not proximate the inlet were not at about the same distance beneath the liquid level, and the uppermost portion of the openings of bubble caps in rows proximate the inlet were not closer to the liquid level than those of the other bubble caps.

Figure 7:
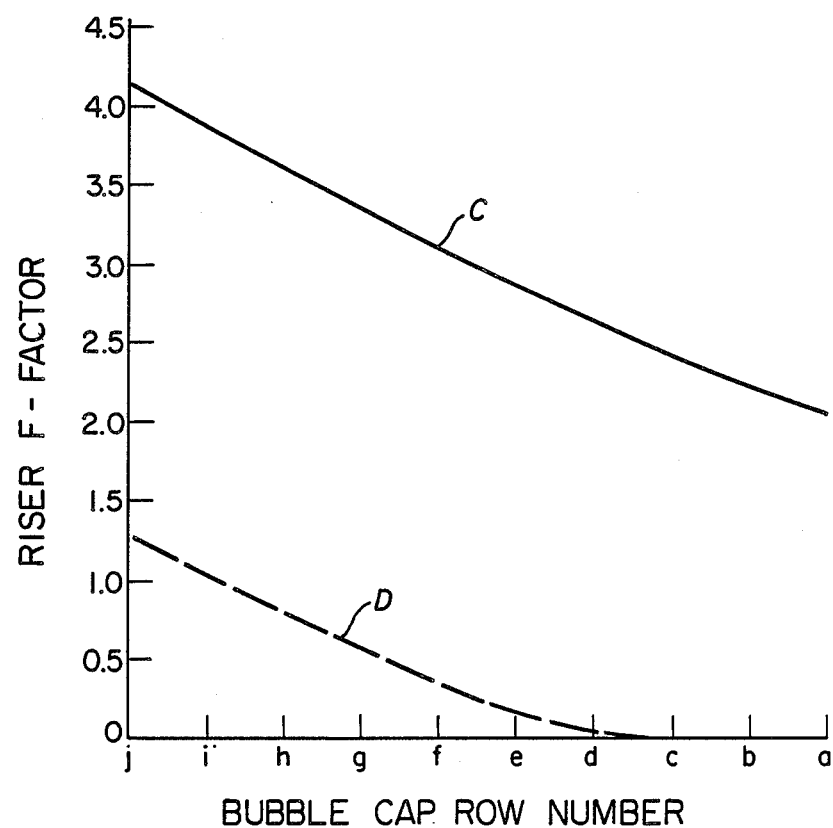
FIG. 7 is a graphical representation of vapor flow through a conventional bubble cap tray at design and low flowrate.

FIG. 7 graphically indicates the vapor flow through this tray at both design and high turndown conditions. The horizontal and vertical axis denote the same as in FIG. 6. Curve C illustrates the vapor flow through the bubble caps in each of rows a–j when the feed is at the design flowrate. As can be seen, although there is vapor flow through each of the bubble cap rows in the tray, the vapor flow passes preferentially through the bubble caps disposed in rows proximate the outlet zone and is not evenly distributed across the tray. This results in inefficient operation. The inefficiency becomes extreme at a feed flowrate of one-fourteenth the design flowrate as illustrated in Curve D. As can be seen there is essentially no activity at the bubble caps proximate the inlet zone thus allowing the possibility of non-uniform vapor-liquid contacting with consequent poor mass transfer activity efficiency and the possible dumping of liquid down through the risers proximate the inlet zone.

Although the invention has been described in detail with reference to specific embodiments, those skilled in the art will recognize that there are a large number of other embodiments within the spirit and scope of the claims. For example, the number of rows of bubble caps and the number of bubble caps in each row may be any useful number. Generally the bubble cap trays of this invention will have from 3 to 40 rows of bubble caps disposed across the tray deck. The size of the bubble caps and the number and size of openings on each bubble cap may differ from the specific embodiments illustrated in the Figures.

We claim:

1. A bubble cap tray having a tray deck, a liquid inlet zone having an inlet weir and a liquid outlet zone having an outlet weir, capable of establishing a liquid level on the tray deck which generally decreases in height from the inlet zone to the outlet zone, and a plurality of bubble caps disposed in rows which are serially disposed on the tray deck from the inlet zone to the outlet zone, characterized by:
   (a) each bubble cap having a plurality of triangular-shaped openings;
   (b) the total area of said openings on each bubble cap being substantially equal;
   (c) each row not proximate the inlet zone having bubble caps with openings whose uppermost portion is at about the same distance beneath the liquid level; and
   (d) each row proximate the inlet zone having bubble caps with openings whose uppermost portion is closer to the liquid level than is the uppermost portion of the openings of the bubble caps in rows not proximate the inlet zone.

2. The bubble cap tray of claim 1 wherein the triangular-shaped openings are in the form of a truncated triangle.

3. The bubble cap tray of claim 1 wherein the opening area is within the range of from 0.5 to 3.0 square inches.

4. The bubble cap tray of claim 1 wherein only the single row most proximate the inlet zone contains bubble caps having openings whose uppermost portion exceeds the height of, and is closer to the liquid level than, the uppermost portion of the openings of the bubble caps in the other rows.

5. The bubble cap tray of claim 1 wherein more than one row proximate the inlet zone contains bubble caps having openings whose uppermost portion exceeds the height of, and is closer to the liquid level than, the uppermost portion of the openings of the bubble caps in the other rows.

6. The bubble cap tray of claim 1 having from 3 to 40 rows of bubble caps disposed across the tray deck.

7. The bubble cap tray of claim 1 wherein each of the triangular shaped openings on any given bubble cap has the same dimensions as the other triangular-shaped openings on said given bubble cap.

8. The bubble cap tray of claim 1 wherein the triangular-shaped openings on any given bubble cap are equidistantly spaced around said given bubble cap.

* * * * *